US012288437B2

(12) United States Patent
Yukawa et al.

(10) Patent No.: US 12,288,437 B2
(45) Date of Patent: Apr. 29, 2025

(54) MONEY HANDLING SYSTEM, MONEY HANDLING METHOD, AND MONEY HANDLING APPARATUS

(71) Applicant: Glory Ltd., Himeji (JP)

(72) Inventors: Atsushi Yukawa, Hyogo (JP); Ryuji Kataoka, Hyogo (JP); Shigeo Namura, Hyogo (JP)

(73) Assignee: GLORY LTD., Himeji (JP)

( * ) Notice: Subject to any disclaimer, the term of this patent is extended or adjusted under 35 U.S.C. 154(b) by 415 days.

(21) Appl. No.: 17/696,871

(22) Filed: Mar. 17, 2022

(65) Prior Publication Data

US 2022/0301381 A1 Sep. 22, 2022

(30) Foreign Application Priority Data

Mar. 19, 2021 (JP) ................................. 2021-046287

(51) Int. Cl.
*G07D 11/245* (2019.01)
*G07D 11/14* (2019.01)

(52) U.S. Cl.
CPC ........... *G07D 11/245* (2019.01); *G07D 11/14* (2019.01)

(58) Field of Classification Search
CPC ........ G07D 11/00; G07D 11/20; G07D 11/24; G07D 11/245
See application file for complete search history.

(56) References Cited

U.S. PATENT DOCUMENTS

2018/0365938 A1* 12/2018 Honda .................. G07D 11/34

FOREIGN PATENT DOCUMENTS

JP 2008-84180 A 4/2008

* cited by examiner

*Primary Examiner* — Thien M Le
*Assistant Examiner* — April A Taylor
(74) *Attorney, Agent, or Firm* — XSENSUS LLP

(57) ABSTRACT

A money handling system includes: a first money handling apparatus that dispenses money; and a setting unit that sets information indicating an amount dispensable from the first money handling apparatus, on the basis of an upper limit amount set in advance as an upper limit of the amount dispensable from the first money handling apparatus, an amount of money dispensed from the first money handling apparatus, and an amount of money deposited into the first money handling apparatus or a second money handling apparatus.

8 Claims, 7 Drawing Sheets

MONEY HANDLING SYSTEM, MONEY HANDLING METHOD, AND MONEY HANDLING APPARATUS

CROSS-REFERENCE TO RELATED APPLICATION

This application claims priority to Japanese Patent Application No. 2021-046287, filed on Mar. 19, 2021, the disclosure of which is incorporated herein by reference in its entirety.

TECHNICAL FIELD

The present disclosure relates to a money handling system, a money handling method, and a money handling apparatus for handling money.

BACKGROUND ART

Money handling systems for handling money are currently used. Money handling systems comprise a settlement machine that is placed in, for example, the selling space of a shop and used by customers of the shop to pay the price of items purchased by the customers and a management machine that is placed in the back office of the shop and used to collect proceeds from sales and replenish the settlement machine with a change fund.

In the settlement machine, a change fund for change is stored. When the change fund in the settlement machine runs short during the hours of operation of the shop, for example, a worker of the shop is to transfer money from the management machine to the settlement machine, that is, replenish the settlement machine with a change fund. To minimize the impact of the occurrence of a problem, if any, the upper limit amount of money dispensable from the management machine may be set in advance for the worker. For example, PTL 1 discloses a cash handling apparatus in which the limit of the amount of money dispensed and the limit of the number of times money is dispensed are set in advance on a per shop basis and on a per shop register basis respectively to prohibit an operation for a dispensing process when the amount of money dispensed or the number of times money is dispensed reaches the corresponding limit.

CITATION LIST

Patent Literature

PTL 1

Japanese Patent Application Laid-Open No. 2008-084180

SUMMARY

A money handling system according to an aspect of the present disclosure comprises: a first money handling apparatus that dispenses money; and a setting unit that sets information indicating an amount dispensable from the first money handling apparatus, based on an upper limit amount set in advance as an upper limit of the amount dispensable from the first money handling apparatus, an amount of money dispensed from the first money handling apparatus, and an amount of money deposited into the first money handling apparatus or a second money handling apparatus.

DESCRIPTION OF EMBODIMENTS

Figure 1:
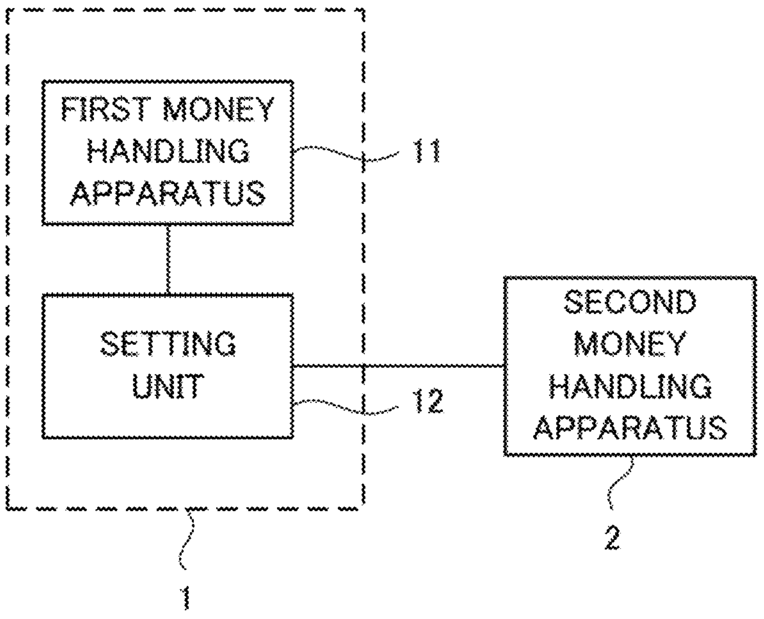
FIG. 1 is a diagram for explaining a configuration of a money handling system according to Embodiment 1.

With the technique disclosed in PTL 1 listed above, however, when a change fund that exceeds the limit of the amount of money dispensed set in advance is needed or a change fund needs to be dispensed a number of times that exceeds the limit of the number of times money is dispensed set in advance for the reason that, for example, the number of visitors is more than expected, dispensing of a change fund from the management machine is difficult. Therefore, it may be difficult to replenish the settlement machine with a change fund.

The present disclosure provides a money handling system, a money handling method, and a money handling apparatus for enabling replenishment with money with more certainty.

In the money handling system according to the aspect of the present disclosure, the setting unit may set information indicating a difference between the upper limit amount and the amount of money dispensed from the first money handling apparatus as the amount dispensable from the first money handling apparatus, after money is dispensed from the first money handling apparatus and before money is deposited into the first money handling apparatus or the second money handling apparatus.

The money handling system according to the aspect of the present disclosure may further comprise the second money handling apparatus, in which when money is deposited into the second money handling apparatus in a replenishment process, the second money handling apparatus may transmit information indicating an amount of the deposited money to the setting unit.

In the money handling system according to the aspect of the present disclosure, the upper limit amount may be set in advance for each of users of the first money handling apparatus, and the setting unit may set the amount dispensable from the first money handling apparatus for each of the users.

In the money handling system according to the aspect of the present disclosure, the second money handling apparatus may comprise an input unit via which identification information of a user depositing money is input, and transmit to the setting unit, data in which the identification information of the user depositing money and an amount of the deposited money are associated with each other, and the setting unit may set the amount dispensable from the first money handling apparatus, based on the data.

A money handling method according to an aspect of the present disclosure is a money handling method to be performed by a computer, the money handling method comprising: obtaining amount dispensed information indicating an amount of money dispensed from a first money handling apparatus; obtaining amount deposited information indicating an amount of money deposited into the first money handling apparatus or a second money handling apparatus; and setting an amount dispensable from the first money handling apparatus, based on an upper limit amount set in advance as an upper limit of the amount dispensable from the first money handling apparatus, the amount dispensed information, and the amount deposited information.

In the money handling method according to the aspect of the present disclosure, a difference between the upper limit amount and the amount of money dispensed from the first money handling apparatus may be set as the amount dispensable from the first money handling apparatus, after money is dispensed from the first money handling apparatus and before money is deposited into the first money handling apparatus or the second money handling apparatus.

In the money handling method according to the aspect of the present disclosure, the amount deposited information may indicate the amount of money deposited into the second money handling apparatus.

In the money handling method according to the aspect of the present disclosure, the upper limit amount may be set in advance for each of users of the first money handling apparatus, and for each of the users, the computer may obtain the amount dispensed information and the amount deposited information and temporarily set a difference between the upper limit amount and the amount of money dispensed from the first money handling apparatus as the amount dispensable from the first money handling apparatus.

In the money handling method according to the aspect of the present disclosure, the second money handling apparatus may be a cash settlement machine that causes payment of a price to be made in cash. The second money handling apparatus may comprise a POS function of obtaining price information of an item. The second money handling apparatus may be connected to a POS apparatus comprising a POS function so as to be able to communicate with the POS apparatus, and may obtain price information from the POS apparatus and cause payment of the price to be made. The second money handling apparatus may be a safe into and from which a worker of a shop deposits and takes out money.

In the money handling method according to the aspect of the present disclosure, the second money handling apparatus may generate the amount deposited information. When the second money handling apparatus is connected to a POS apparatus so as to be able to communicate with the POS apparatus, the POS apparatus may generate the amount deposited information. When middleware that is another computer for interconnection is disposed between the second money handling apparatus and the POS apparatus, the middleware may generate the amount deposited information.

A money handling apparatus according to an aspect of the present disclosure is a money handling apparatus comprising: a money handling unit that dispenses money; and a control unit that obtains or generates setting information indicating an amount dispensable from the money handling unit, and controls and causes the money handling unit to dispense an amount of money less than or equal to the amount indicated by the setting information, in which the setting information is set, based on an upper limit amount set in advance as an upper limit of the amount dispensable from the money handling unit, an amount of money dispensed from the money handling unit, and an amount of money deposited into the money handling apparatus or another money handling apparatus.

In the money handling apparatus according to the aspect of the present disclosure, the amount indicated by the setting information may be a difference between the upper limit amount and the amount of money dispensed from the money handling unit, after money is dispensed from the money handling unit and before money is deposited into the money handling unit or the other money handling apparatus.

In the money handling apparatus according to the aspect of the present disclosure, the control unit may generate the setting information.

In the money handling apparatus according to the aspect of the present disclosure, the upper limit amount may be set in advance for each of users of the money handling apparatus, and the setting information may be set for each of the users.

According to aspects of the present disclosure, replenishment with money is enabled with more certainty.

Hereinafter, embodiments of the present disclosure will be described in detail with reference to the drawings. Note that detailed descriptions more than necessary, such as a detailed description of a well-known matter and duplicated descriptions of substantially the same configurations, may be omitted. The following description and the drawings for reference are provided for a person skilled in the art to understand the present disclosure, and are not intended to limit the scope of the claims of the present disclosure. For example, a matter described in an embodiment may be applicable to another embodiment, and an embodiment may comprise an element of another embodiment.

Embodiment 1

A description of a money handling system 1 according to Embodiment 1 of the present disclosure will be given below. As illustrated in FIG. 1, the money handling system 1 comprises a first money handling apparatus 11 and a setting unit 12. The first money handling apparatus 11 and the setting unit 12 are connected to each other so as to be able to communicate with each other.

The first money handling apparatus 11 is an apparatus that at least dispense money. When dispensing money, the first money handling apparatus 11 generates amount dispensed information indicating the dispensed amount.

The first money handling apparatus 11 may comprise a function of accepting deposited money. When accepting deposited money, the first money handling apparatus 11 generates amount deposited information indicating the deposited amount.

The setting unit 12 sets information indicating an amount dispensable from the first money handling apparatus 11 and manages the information as setting information. In other words, the setting unit 12 stores information indicating an amount dispensable from the first money handling apparatus 11 in a storage apparatus of the setting unit 12. The setting unit 12 comprises a processor, such as a central processing unit (CPU), and the storage apparatus (a flash memory or a hard disk drive (HDD)) and implements functions by the processor executing a program read from the storage apparatus. In an exemplary implementation, setting unit 12 is encompassed by or may include processing circuitry which will be discussed later with respect to FIG. 6. Note that the setting information may be stored not in the storage apparatus of the setting unit 12 but in an external storage apparatus connected to the setting unit 12 so as to be able to communicate with the setting unit 12.

The setting unit 12 sets the information indicating the dispensable amount on the basis of upper limit amount information, the amount dispensed information, and the amount deposited information. The upper limit amount information is information indicating an upper limit amount set in advance as the upper limit of the amount dispensable from the first money handling apparatus 11. The method for the setting unit 12 to set the information indicating the dispensable amount will be described in detail in Embodiment 3 described below.

The setting unit 12 is connected to a second money handling apparatus 2 so as to be able to communicate with the second money handling apparatus 2.

The second money handling apparatus 2 is a money handling apparatus different from the first money handling apparatus 11. The second money handling apparatus 2 is a money handling apparatus that may need to be replenished with money, and comprises at least a function of accepting deposited money. When accepting deposited money, the second money handling apparatus 2 generates amount deposited information indicating the deposited amount.

In the example illustrated in FIG. 1, although the second money handling apparatus 2 is not comprised in the money handling system 1, the second money handling apparatus may be comprised in the money handling system in the present disclosure.

Figure 2:
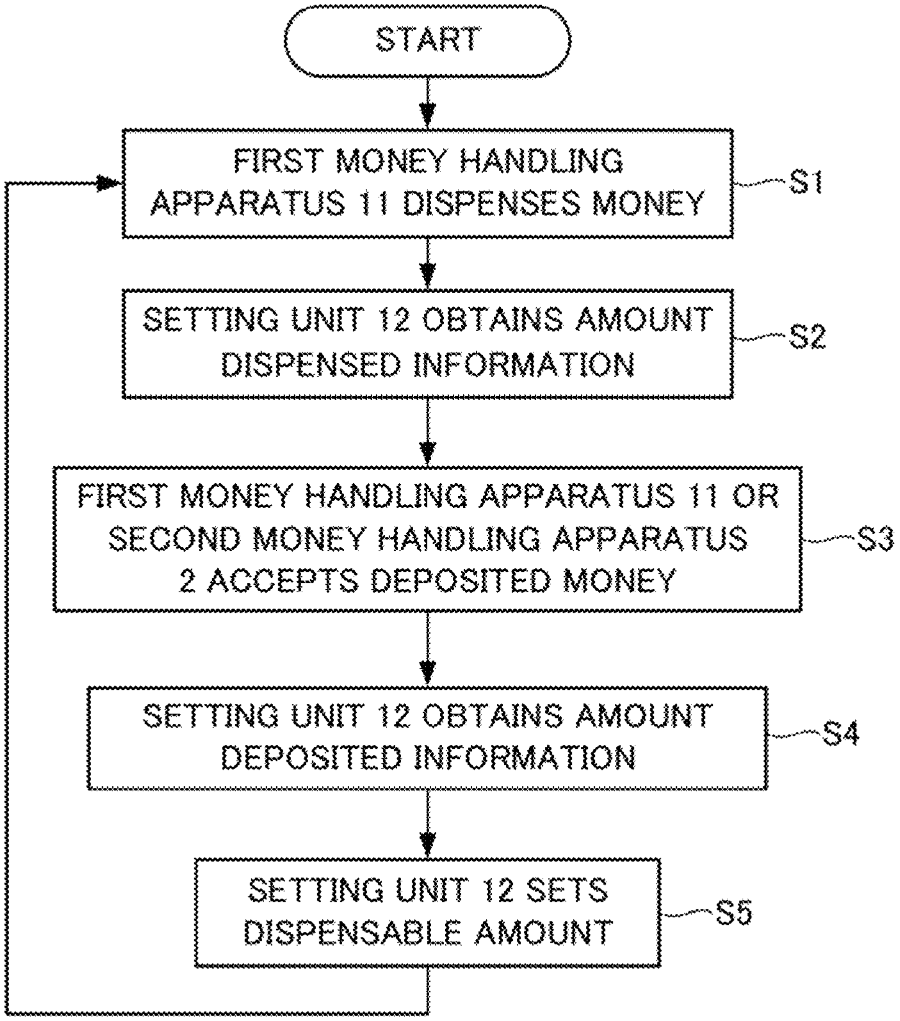
FIG. 2 is a flowchart illustrating an example operation of the money handling system according to Embodiment 1.

FIG. 2 is a flowchart illustrating an example operation of the money handling system 1 according to Embodiment 1. In step S1, the first money handling apparatus 11 dispenses money. At this time, the first money handling apparatus 11 generates amount dispensed information indicating the amount of the dispensed money.

In step S2, the setting unit 12 obtains the amount dispensed information. The amount dispensed information obtained by the setting unit 12 needs to be stored in, for example, a storage apparatus not illustrated.

In step S3, the first money handling apparatus 11 or the second money handling apparatus 2 accepts deposited money. At this time, the first money handling apparatus 11 or the second money handling apparatus 2 generates amount deposited information indicating the amount of the deposited money. A case where money dispensed from the first money handling apparatus 11 is deposited into the first money handling apparatus 11 includes a case where, for example, a wrong amount of money or money of wrong denominations dispensed from the first money handling apparatus 11 is deposited into the first money handling apparatus 11.

In step S4, the setting unit 12 obtains the amount deposited information.

In step S5, the setting unit 12 sets information indicating the dispensable amount on the basis of the amount dispensed information, the amount deposited information, and upper limit amount information. Thereafter, the process returns to step S1.

Setting information generated by the setting unit 12 on the basis of the information, set in step S5, indicating the dispensable amount is transmitted to the first money handling apparatus 11. The first money handling apparatus 11 receives and stores in a storage unit the transmitted setting information. Thereafter, in response to a request for dispensing money, the first money handling apparatus 11 determines whether dispensing of money is allowed, on the basis of whether the requested amount to be dispensed is larger than the dispensable amount indicated by the setting information stored in the storage unit.

Note that determination, based on the setting information, as to whether to allow dispensing of money may be performed not by the first money handling apparatus 11 but by the setting unit 12. In this case, the setting information generated by the setting unit 12 is stored in, for example, the storage apparatus, and in response to a request for dispensing money made to the first money handling apparatus 11, information indicating the requested amount to be dispensed is transmitted to the setting unit 12. The setting unit 12 determines whether dispensing of money is allowed, on the basis of the setting information and the information indicating the requested amount to be dispensed, and generates and transmits to the first money handling apparatus 11 information indicating the result of determination. The money handling system 1 decides to dispense or not to dispense the requested amount to be dispensed, on the basis of the information indicating the result of determination.

With the money handling system according to Embodiment 1 described above, information indicating the amount dispensable from the first money handling apparatus 11 is set by the setting unit 12, on the basis of the upper limit amount information indicating the upper limit amount set in advance, the amount dispensed information indicating the amount dispensed from the first money handling apparatus 11, and the amount deposited information indicating the amount deposited into the first money handling apparatus 11 or the second money handling apparatus 2.

When the dispensable amount is thus set, the following effect is attained. When money dispensed from the first money handling apparatus 11 is deposited into the second money handling apparatus 2, the setting unit 12 increases the dispensable amount by the deposited amount. Accordingly, for example, when the need to deposit a large amount of money into the second money handling apparatus 2 arises, money is dispensed from the first money handling apparatus 11 and deposited into the second money handling apparatus 2 a plurality of times repeatedly to thereby easily meet the need to deposit a large amount of money up to the upper limit amount.

Embodiment 2

A description of the money handling system 1 according to Embodiment 2 of the present disclosure will be given below. The configuration of the money handling system 1 according to Embodiment 2 of the present disclosure is the same as the configuration illustrated in FIG. 1, and therefore, a description thereof is omitted.

Figure 3:
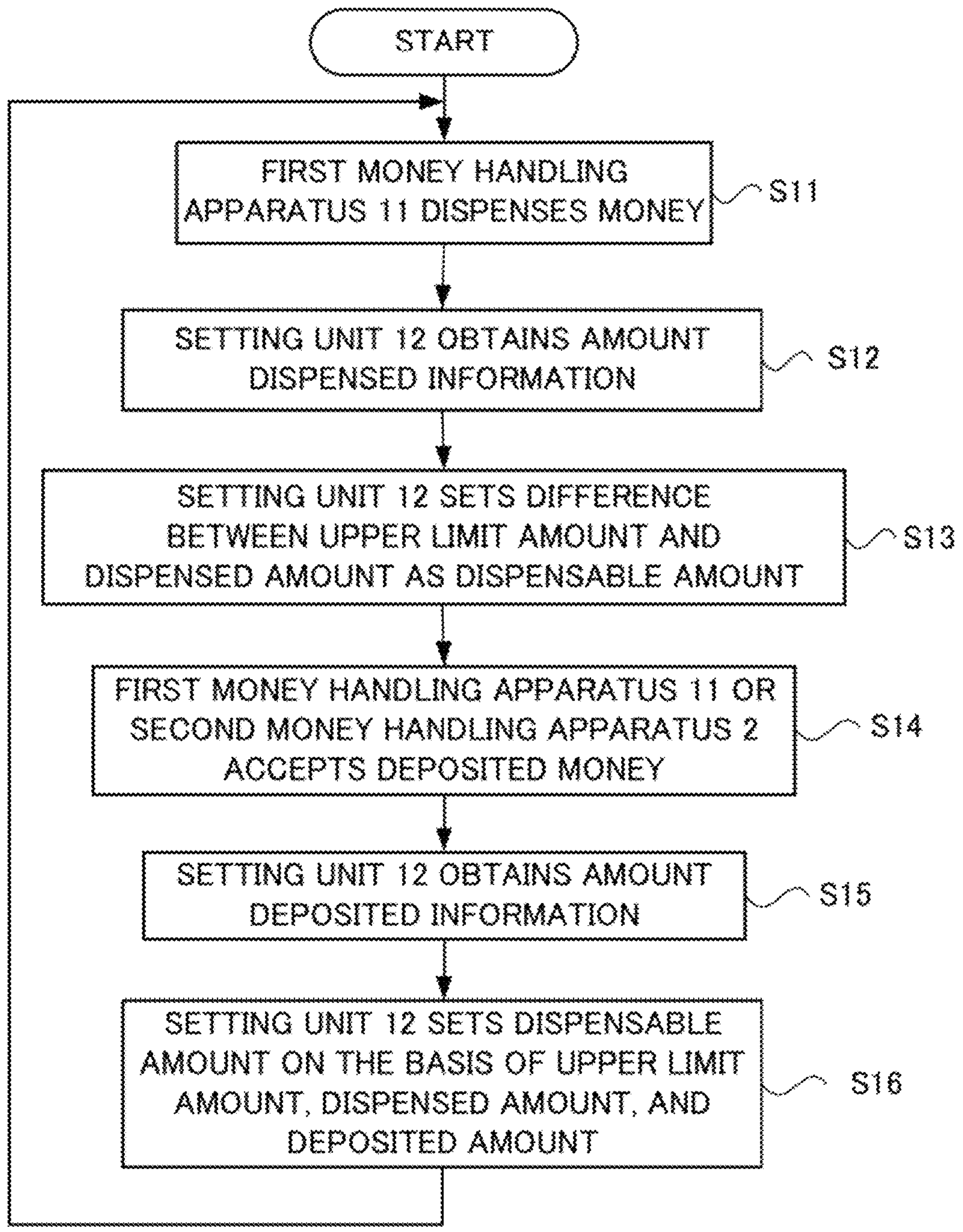
FIG. 3 is a flowchart illustrating an example operation of the money handling system according to Embodiment 2.

FIG. 3 is a flowchart illustrating an example operation of the money handling system 1 according to Embodiment 2. In step S11, the first money handling apparatus 11 dispenses money. At this time, the first money handling apparatus 11 generates amount dispensed information indicating the amount of the dispensed money.

In step S12, the setting unit 12 obtains the amount dispensed information. The amount dispensed information obtained by the setting unit 12 needs to be stored in, for example, the storage apparatus of the setting unit 12.

In step S13, the setting unit 12 sets information indicating the dispensable amount on the basis of the amount dispensed information and upper limit amount information managed in advance to thereby generate setting information indicating the set amount. More specifically, the setting unit 12 sets the difference between the dispensed amount and the upper limit amount as the dispensable amount. The generated setting information is transmitted to the first money handling apparatus 11. In response to a further request for dispensing money made between step S13 and step S14, that is, after money is dispensed from the first money handling apparatus 11 and before money is deposited into the money handling system 1 or the second money handling apparatus 2, the first money handling apparatus 11 determines whether dispensing of money is allowed, on the basis of whether the requested amount to be dispensed is larger than the dispensable amount indicated by the setting information.

Next, in step S14, the first money handling apparatus 11 or the second money handling apparatus 2 accepts deposited money. At this time, the first money handling apparatus 11 or the second money handling apparatus 2 generates amount deposited information indicating the amount of the deposited money.

In step S15, the setting unit 12 obtains the amount deposited information.

In step S16, the setting unit 12 sets information indicating the dispensable amount on the basis of the amount dispensed information, the amount deposited information, and the upper limit amount information. More specifically, the setting unit 12 sets as the dispensable amount, an amount obtained by adding the deposited amount to the difference between the dispensed amount and the upper limit amount. Thereafter, the process returns to step S11.

Setting information generated in step S16 is transmitted to the first money handling apparatus 11. The first money handling apparatus 11 overwrites the setting information set in step S13 with the setting information set in step S16. In response to a request for dispensing money made thereafter, determination as to whether dispensing of money is allowed is performed on the basis of whether the requested amount to be dispensed is larger than the dispensable amount indicated by the setting information.

With the money handling system according to Embodiment 2 described above, the setting unit 12 sets the dispensable amount when money is dispensed from the first money handling apparatus 11 and resets the dispensable amount after money is subsequently deposited into the first money handling apparatus 11 or the second money handling apparatus 2.

Therefore, the dispensable amount can be set to different amounts before money dispensed from the first money handling apparatus 11 is deposited into the first money handling apparatus 11 or the second money handling apparatus 2 and after money is subsequently deposited into the first money handling apparatus 11 or the second money handling apparatus 2. Accordingly, the money handling system 1 can comply with various operation methods.

Embodiment 3

Figure 4:
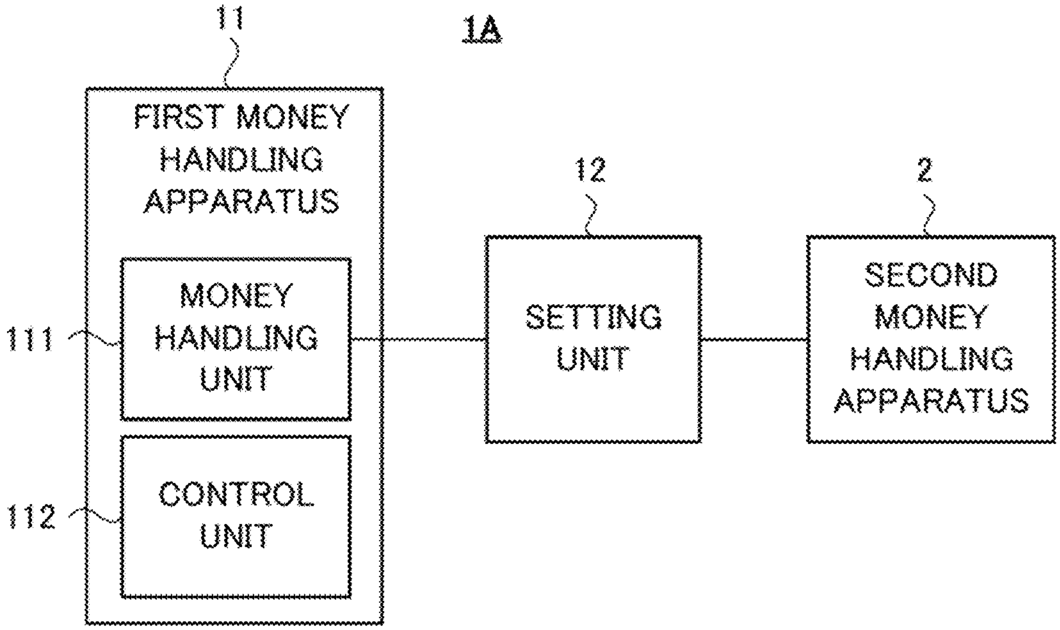
FIG. 4 is a diagram for explaining a configuration of a money handling system according to Embodiment 3.

A description of a money handling system 1A according to Embodiment 3 of the present disclosure will be given below. As illustrated in FIG. 4, the money handling system 1A comprises the first money handling apparatus 11, the second money handling apparatus 2, and the setting unit 12. It is assumed that the money handling system 1A is placed in, for example, a retail shop, such as a specialty shop, a convenience store, or a supermarket.

The first money handling apparatus 11 is a cash management machine placed in, for example, the back office of a shop. The first money handling apparatus 11 comprises a function of managing a change fund with which a cash settlement machine (which corresponds to the second money handling apparatus 2 described below) placed inside the shop is replenished. Although a detailed description will not be given in this embodiment, the first money handling apparatus 11 may comprise, for example, other functions, such as a function of managing proceeds from sales of the shop.

As illustrated in FIG. 4, the first money handling apparatus 11 comprises a money handling unit 111 that stores money and allows money to be dispensed and deposited and a control unit 112 that controls operations of the first money handling apparatus 11. The control unit 112 comprises, for example, a processor, such as a CPU, and a storage apparatus (a flash memory or an HDD). In an exemplary implementation, control unit 112 is encompassed by or may include processing circuitry which will be discussed later with respect to FIG. 6. The first money handling apparatus 11 that comprises the control unit 112 as an arithmetic apparatus or a control apparatus is provided with an output apparatus, such as a display not illustrated, and an input apparatus, such as a keyboard or a touch panel not illustrated, and is a kind of computer.

Under the control of the control unit 112, the first money handling apparatus 11 performs, for example, an operation of dispensing a change fund in response to an operation performed by a worker of the shop or the like, an operation of accepting deposited proceeds from sales, and an operation of totaling and managing a change fund.

The first money handling apparatus 11 further performs, when dispensing a change fund, an operation of generating amount dispensed information indicating the amount dispensed for the worker who performs an operation for money to be dispensed.

The operation of generating amount dispensed information will be described with a specific example. For example, the first money handling apparatus 11 comprises a reader for reading identification information set in advance for each worker, and the control unit 112 performs an identification process on the basis of identification information of a worker read by the reader and accepts an operation performed by the worker when the worker is successfully identified. When the worker performs an operation for a change fund to be dispensed, the control unit 112 determines whether dispensing of an amount of money requested in the operation for money to be dispensed is allowed, on the basis of setting information set for the worker. Setting information is information set for each worker and indicating the amount dispensable for the worker.

When the control unit 112 determines that dispensing of the amount of money requested in the operation for money to be dispensed is allowed, the control unit 112 controls and causes the money handling unit 111 to dispense the amount of change fund requested by the worker. The control unit 112 generates amount dispensed information comprising the identification information of the worker and the dispensed amount. The control unit 112 causes, for example, a communication unit not illustrated to transmit the generated amount dispensed information to the setting unit 12.

On the other hand, when the control unit 112 determines that dispensing of the amount of money requested in the operation for money to be dispensed is not allowed, the control unit 112 causes, for example, a display not illustrated to display a message saying that the operation for money to be dispensed is not accepted, and cancels the operation for money to be dispensed.

The second money handling apparatus 2 is a cash settlement machine placed in, for example, the selling space of the shop. The cash settlement machine is an apparatus that obtains price information indicating the price of an item when, for example, a customer of the shop is to purchase the item, and causes the customer to pay the price in cash. The cash settlement machine comprises a Point Of Sale (POS) function of obtaining price information, a function of storing money, a function of accepting the price of an item deposited by a customer, and a function of dispensing change. The POS function is a function of reading from, for example, an item, item information for recognizing the item, searching a database, not illustrated for managing item data, for an item that matches the item information, and obtaining, for example, information regarding the price of the item.

Note that the second money handling apparatus 2, which is a cash settlement machine, may be operated not directly by a customer but by, for example, a worker of the shop. In this case, at the time of payment of the price of an item, the worker receives the price from the customer, performs an operation for depositing the price into the second money handling apparatus 2, and gives the customer their change dispensed from the second money handling apparatus 2.

The second money handling apparatus 2, which is a cash settlement machine, comprises a function of accepting a change fund for change deposited by, for example, a worker of the shop and a function of managing change, in addition to the function of storing money, the function of accepting money deposited by a customer, and the function of dispensing change. For example, when the change fund is about to run out during the hours of operation of the shop, the second money handling apparatus 2 notifies and requests a worker to replenish the second money handling apparatus 2 with a change fund. In this case, the worker performs an operation for a necessary amount of change fund to be dispensed from the first money handling apparatus 11, which is a cash management machine, and carries the dispensed change fund to the second money handling apparatus 2, which is a cash settlement machine, and deposits the dispensed change fund into the second money handling apparatus 2. The process of replenishment with a change fund is an example of a replenishment process of the present disclosure.

The second money handling apparatus 2 further comprises a function of generating, when a worker deposits a change fund, amount deposited information indicating the amount deposited by the worker who performs the operation for depositing.

The function of generating amount deposited information will be described with a specific example. For example, the second money handling apparatus 2 comprises a reader for reading identification information set in advance for each worker, performs an identification process by reading identification information of a worker by the reader, and accepts an operation performed by the worker when the worker is successfully identified. When the worker performs an operation for depositing a change fund, the second money handling apparatus 2 counts money deposited by the worker as the change fund and generates amount deposited information on the basis of the result of counting and the identification information of the worker. The second money handling apparatus 2 transmits the generated amount deposited information to the setting unit 12.

Accordingly, in the money handling system 1A, a worker can perform an operation for a change fund to be dispensed from the first money handling apparatus 11. To limit the extent of the impact of the occurrence of a problem, if any, an amount dispensable from the first money handling apparatus 11 is set in advance for, for example, each worker. The setting unit 12 comprises a function of setting the dispensable amount.

The setting unit 12 is connected to the first money handling apparatus 11 and to the second money handling apparatus 2 so as to be able to communicate with both. The setting unit 12 is, for example, a computer such as a server. The setting unit 12 comprises, for example, a processor such as a CPU, a storage apparatus (a flash memory or an HDD), and an input apparatus such as a keyboard or a touch panel.

The setting unit 12 stores in, for example, the storage apparatus, upper limit amount information that is generated in advance for, for example, each worker and that indicates the upper limit of the amount dispensable from the first money handling apparatus 11, and manage the upper limit amount information. When receiving amount dispensed information from the first money handling apparatus 11 or when receiving amount deposited information from the second money handling apparatus 2, the setting unit 12 newly sets information indicating the amount dispensable for a worker corresponding to the amount dispensed information or the amount deposited information and transmits the newly set setting information indicating the dispensable amount to the first money handling apparatus 11.

The setting unit 12 sets information indicating the dispensable amount, on the basis of upper limit amount information, amount dispensed information, and amount deposited information. Specifically, the setting unit 12 sets the dispensable amount as follows. The amount of money dispensed from the first money handling apparatus 11 is denoted by $A_{out}$, the amount of money deposited into the first money handling apparatus 11 or the second money handling apparatus 2 is denoted by $A_{in}$, and the upper limit amount is denoted by $A_{limit}$. Then, the dispensable amount $A_{able}$ is calculated by using equation 1 below.

$$A_{able}=A_{limit}-A_{out}+A_{in} \tag{1}$$

The setting unit 12 performs an operation of setting information indicating the dispensable amount to generate setting information each time the setting unit 12 receives, for example, amount dispensed information or amount deposited information.

The dispensable amount set by the setting unit 12 in the operation of the money handling system 1A described above changes as follow in accordance with whether a change fund is dispensed from the first money handling apparatus 11.

Until a certain worker W performs an operation for a change fund to be dispensed from the first money handling apparatus 11, both the dispensed amount and the deposited amount are equal to zero, and therefore, the amount dispensable for the worker W is set to an amount equal to the upper limit amount ($A_{able}=A_{limit}$).

After the worker W performs the operation for money to be dispensed from the first money handling apparatus 11, the deposited amount is equal to zero until the worker W deposits money into the first money handling apparatus 11 or the second money handling apparatus 2, and therefore, the amount dispensable for the worker W is set to an amount obtained by subtracting the dispensed amount from the upper limit amount (the difference between the upper limit amount and the dispensed amount) ($A_{able}=A_{limit}-A_{out}$).

After the worker W performs the operation for money to be dispensed from the first money handling apparatus 11 and deposits money into the first money handling apparatus 11 or the second money handling apparatus 2, the amount dispensable for the worker W is set to an amount obtained by subtracting the dispensed amount from the upper limit amount and adding the deposited amount to the result of subtraction ($A_{able}=A_{limit}-A_{out}+A_{in}$).

Figure 5A:
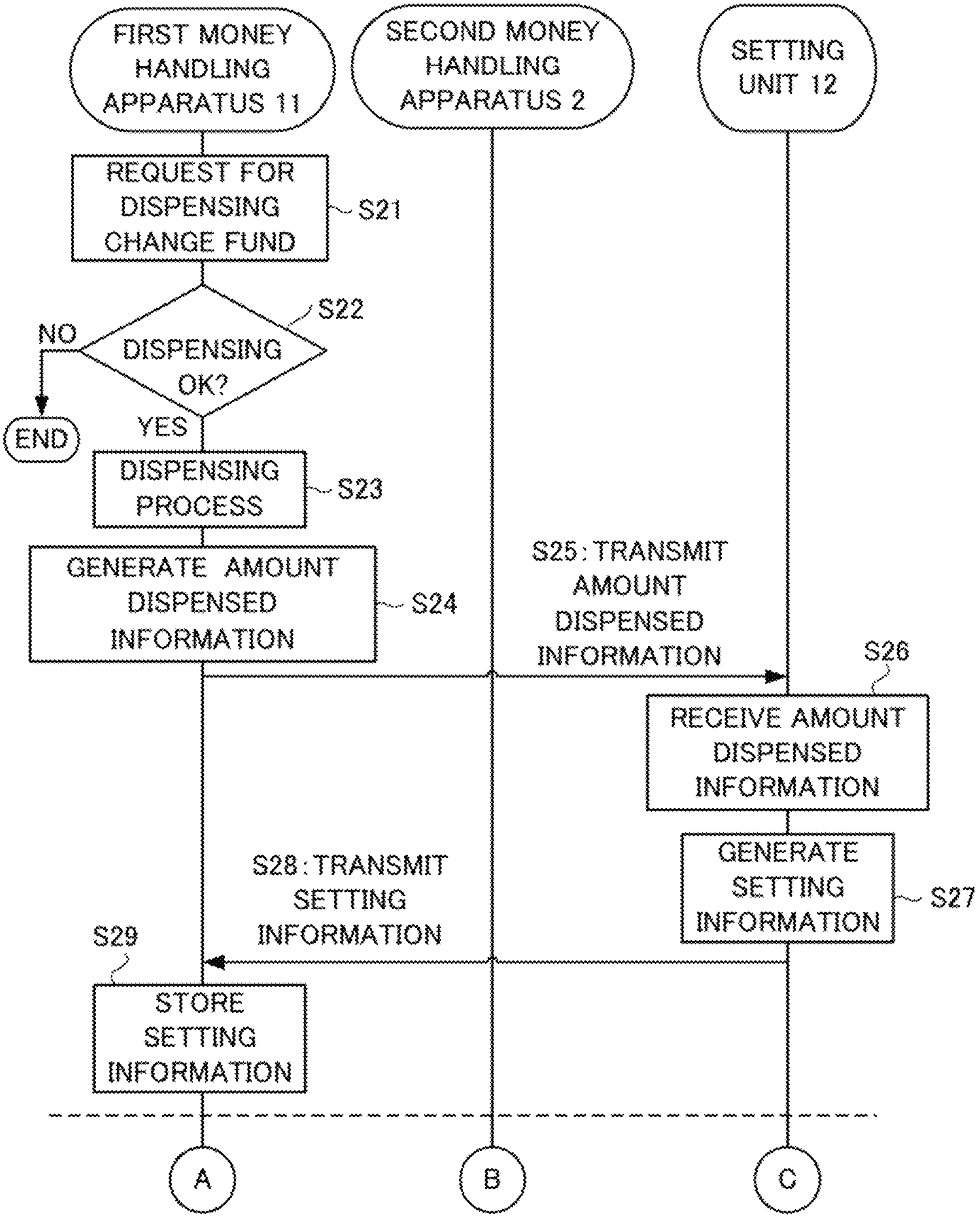
FIGS. 5A and 5B include a sequence chart illustrating an example operation related to generation of setting information in the money handling system according to Embodiment 3.
Figure 5B:
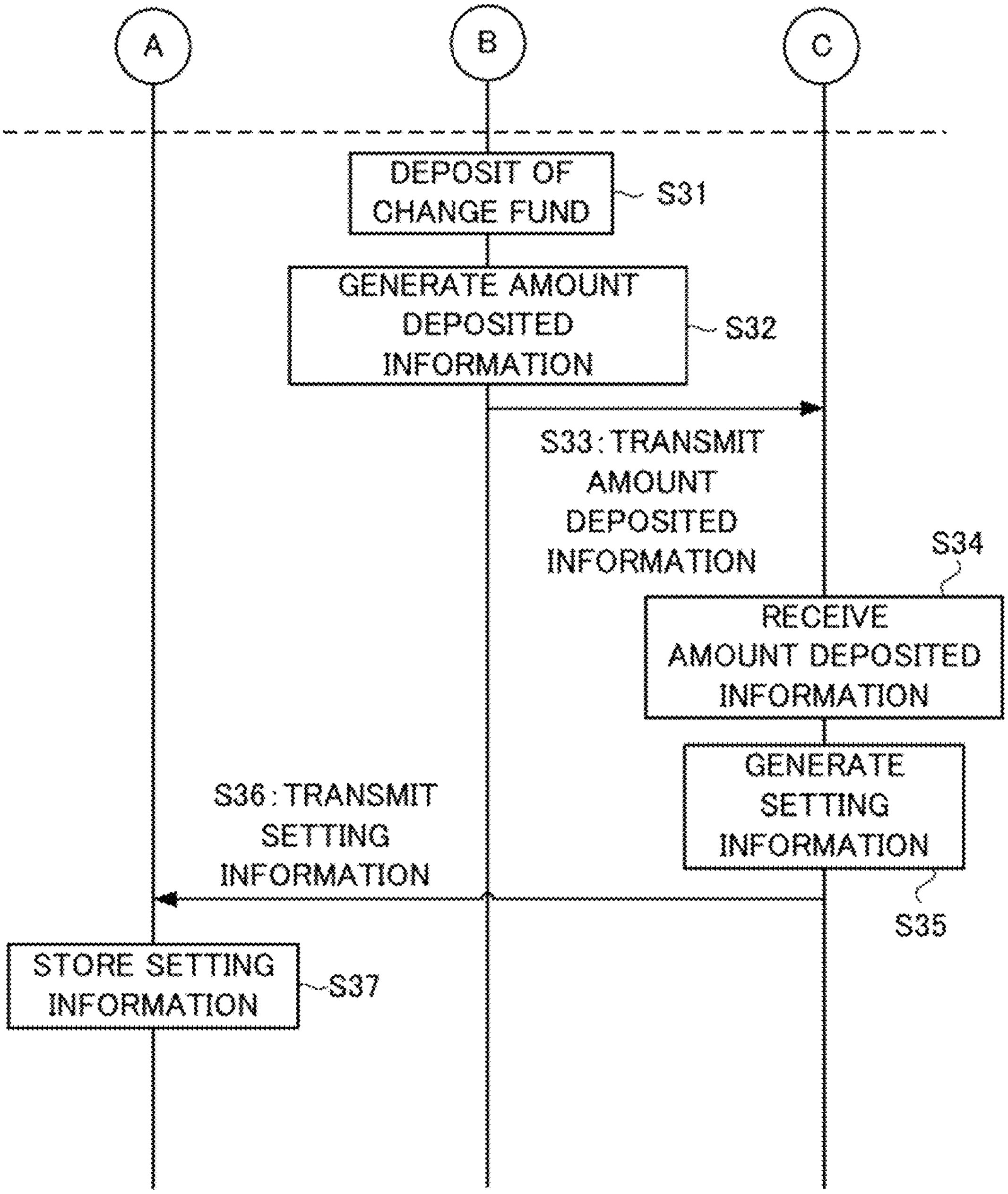

FIGS. 5A and 5B include a sequence chart illustrating an example operation related to generation of setting information in the money handling system 1A. In step S21, the first money handling apparatus 11 accepts a request for dispensing a change fund made by a certain worker W. In step S22, the first money handling apparatus 11 determines whether to accept an operation for money to be dispensed, on the basis of whether the requested amount exceeds a dispensable amount indicated by setting information retained in advance. If the worker W does not yet perform an operation for money to be dispensed, the amount indicated by the setting information is equal to the upper limit set in advance for the worker W as described above.

If the first money handling apparatus 11 determines that an operation for money to be dispensed is accepted in step S22, the process proceeds to step S23. If the first money handling apparatus 11 determines that an operation for money to be dispensed is not accepted in step S22, the first money handling apparatus 11 causes a message to be displayed saying that the operation for money to be dispensed is not accepted, and the process ends.

When the requested amount is less than or equal to the dispensable amount, in step S23, the first money handling apparatus 11 dispenses a change fund. In step S24, the first money handling apparatus 11 generates amount dispensed information comprising identification information of the worker W and information indicating the dispensed amount. In step S25, the first money handling apparatus 11 transmits the amount dispensed information to the setting unit 12.

In step S26, the setting unit 12 receives the amount dispensed information. In step S27, the setting unit 12 newly sets information indicating the amount dispensable for the worker W, on the basis of the received amount dispensed information and upper limit amount information corresponding to the identification information of the worker W comprised in the amount dispensed information to thereby generate setting information. In step S28, the setting unit 12 transmits the setting information to the first money handling apparatus 11.

In step S29, the first money handling apparatus 11 receives the new setting information and updates the old setting information. Accordingly, when the worker W attempts to further performs an operation for money to be dispensed from the first money handling apparatus 11 before the money dispensed by an operation of the worker W is deposited, the first money handling apparatus 11 determines whether dispensing of money is allowed, on the basis of the new amount indicated by the newly generated setting information. The dispensable amount at this time point is equal to an amount obtained by subtracting the dispensed amount from the upper limit.

Next, in step S31, the second money handling apparatus 2 accepts a change fund deposited by the worker W. In step S32, the second money handling apparatus 2 generates amount deposited information comprising the identification information of the worker W and information indicating the deposited amount. In step S33, the second money handling apparatus 2 transmits the amount deposited information to the setting unit 12.

In step S34, the setting unit 12 receives the amount deposited information. In step S35, the setting unit 12 newly sets information indicating the amount dispensable for the worker W, on the basis of the received amount deposited information, the amount dispensed information received before reception of the amount deposited information, and the upper limit amount information corresponding to the identification information of the worker W comprised in the amount dispensed information to thereby generate setting information. The amount dispensed information received before reception of the amount deposited information is information indicating the amount of money dispensed from the first money handling apparatus 11 before the worker W deposits money into the second money handling apparatus 2, and is the amount dispensed information received in step S26 in the example illustrated in FIG. 5A.

In step S36, the setting unit 12 transmits the setting information to the first money handling apparatus 11. In step S37, the first money handling apparatus 11 receives the new setting information and updates the old setting information. The amount indicated by the setting information at this time point is equal to an amount obtained by subtracting the dispensed amount from the upper limit and adding the deposited amount to the result of subtraction, as expressed by equation 1 above. That is, after the worker W performs an operation for money to be dispensed from the first money handling apparatus 11 and before the worker W deposits money into the second money handling apparatus 2, the dispensable amount is lower than the upper limit amount. After the worker W deposits money, the dispensable amount is increased by the deposited amount. When the deposited amount and the dispensed amount are equal to each other, that is, when the worker W deposits a change fund dispensed from the first money handling apparatus 11 into the second money handling apparatus 2 in full, the dispensable amount returns to the upper limit amount.

Therefore, when the worker W attempts to perform an operation for money to be dispensed from the first money handling apparatus 11 again after step S37, the amount dispensable for the worker W is larger than that before the worker W deposits money into the second money handling apparatus 2. Therefore, even when the total amount of a change fund deposited into the second money handling apparatus 2 exceeds the upper limit amount for the worker W, the worker W can repeatedly perform an operation for money to be dispensed from the first money handling apparatus 11 and depositing money into the second money handling apparatus 2 as long as the amount of transfer per operation does not exceed the upper limit amount for the worker W, and replenishment with a change fund can be performed every time with certainty.

<Effects>

As described above, with the money handling systems 1 and 1A according to the embodiments of the present disclosure, the setting unit 12 sets as needed the amount dispensable from the first money handling apparatus 11, on the basis of the upper limit amount set in advance as the upper limit of the amount dispensable from the first money handling apparatus 11, the amount of money dispensed from the first money handling apparatus 11, and the amount of money deposited into the first money handling apparatus 11 or the second money handling apparatus 2.

In some money handling systems of the related art, an amount is subtracted from the dispensable amount set for each worker each time the worker performs an operation for money to be dispensed from a cash management machine, and an amount is added to the dispensable amount, for example, when the worker deposits money into the cash management machine or when the date changes, in accordance with the deposited amount. In such money handling systems of the related art, for example, when a cash settlement machine has the need for a change fund that exceeds the amount dispensable for the worker at once, it is difficult for the one worker to fully replenish the cash settlement machine with the change fund from the cash management machine. For example, when one worker works two or more shifts a day and when the worker performs an operation for replenishment with a change fund in the first shift, it is difficult to perform again an operation for replenishment with a change fund in the second shift. In some cases, the worker can respond to such a situation by going through a procedure for, for example, obtaining approval of the administrator of the money handling system. However, obtaining approval is troublesome, takes time, and increases effort made by the worker.

In the money handling systems 1 and 1A according to the embodiments of the present disclosure, the dispensable amount is reset as needed, on the basis of the amount of money dispensed from the first money handling apparatus 11 and the amount of money deposited into the first money handling apparatus 11 or the second money handling apparatus 2. Therefore, even when an amount of change fund that exceeds the upper limit amount for the worker W needs to be deposited, the worker W can transfer the change fund without any problem by repeatedly performing an operation for money to be dispensed from the first money handling apparatus 11 and depositing money into the second money handling apparatus 2. Even when the worker W works two or more shifts a day, the dispensable amount is increased at the time point of deposit, and therefore, dispensing of money again is allowed in the second shift, and a plurality of cash settlement machines can be replenished by the one worker W. Therefore, replenishment with a change fund can be performed with high flexibility without an increase in effort made by the worker.

<Modifications>

The above-described embodiments are only examples of the present disclosure, and the present disclosure is applicable to forms other than the above-described embodiments.

In Embodiments 1 to 3 described above, setting information indicating the dispensable amount is set by the setting unit 12 as needed on the basis of amount dispensed information indicating the amount dispensed from the first money handling apparatus 11, amount deposited information indicating the amount deposited into the first money handling apparatus 11 or the second money handling apparatus 2, and upper limit amount information indicating the upper limit of the dispensable amount set in advance. To further simplify the process, for example, the setting unit 12 may overwrite, when generating new setting information, old setting information with the new setting information. That is, when a change fund is dispensed from the first money handling apparatus 11, the setting unit 12 subtracts the dispensed amount indicated by amount dispensed information from the dispensable amount indicated by setting information to thereby overwrite the setting information. At the timing when money is deposited into the first money handling apparatus 11 or the second money handling apparatus 2, the setting unit 12 adds the deposited amount indicated by amount deposited information to the dispensable amount indicated by the setting information to thereby overwrite the setting information again. When such a process is employed, the setting unit 12 need not retain upper limit information indicating the upper limit of the dispensable amount, and the process is simplified.

In Embodiment 3 described above, a case has been described where money is deposited into the second money handling apparatus 2, which is a cash settlement machine, after a change fund is dispensed from the first money handling apparatus 11, which is a cash management machine. When, for example, the worker W performs by mistake, an operation for a change fund to be dispensed and returns the change fund dispensed from the first money handling apparatus 11 to the first money handling apparatus 11, the money handling system of the present disclosure can respond to such a situation.

In this case, when the worker W performs an operation for a change fund to be dispensed from the first money handling apparatus 11 and subsequently makes a request to the first money handling apparatus 11 for depositing money, the first money handling apparatus 11 accepts the deposited money and generates amount deposited information. The first money handling apparatus 11 needs to transmit the generated amount deposited information to the setting unit 12, and the setting unit 12 needs to newly set information indicating the dispensable amount, on the basis of the received amount deposited information, amount dispensed information, and upper limit amount information.

In Embodiment 3 described above, although a case where the second money handling apparatus 2, which is a cash settlement machine, comprises the POS function of obtaining price information of an item has been described, the present disclosure is not limited to this. For example, a POS apparatus comprising a POS function may be provided separately from the second money handling apparatus 2, which is a cash settlement machine. In this case, the second money handling apparatus 2 and the POS apparatus need to be connected to each other so as to be able to communicate with each other, and the second money handling apparatus 2 needs to obtain price information from the POS apparatus and causes payment of the price to be made.

The second money handling apparatus 2 may be a simple drawer (safe) not comprising a function of dispensing change, and an apparatus comprising a POS function, that is, a POS register. In this case, a worker needs to operate the drawer on the basis of price information obtained by the POS function, store the price paid by the customer in the drawer, and input the stored amount. The POS function needs to display the amount of change corresponding to the stored amount, and the worker needs to give the displayed amount of change from the drawer. The second money handling apparatus 2 may be a simple drawer comprising no POS function. In this case, the second money handling apparatus 2 needs to be connected to another apparatus comprising a POS function so as to be able to communicate with the other apparatus, and the other apparatus needs to transmit price information to the second money handling apparatus 2.

In Embodiment 3 described above, when a change fund is deposited into the second money handling apparatus 2, the second money handling apparatus 2 generates and transmits to the setting unit 12 amount deposited information. However, the second money handling apparatus 2 need not be responsible for generating and transmitting amount deposited information. For example, when the second money handling apparatus 2 is connected to a POS apparatus so as to be able to communicate with the POS apparatus, the POS apparatus may generate and transmit to the setting unit 12 amount deposited information when a change fund is deposited into the second money handling apparatus 2. When another computer for interconnection (which is called, for example, middleware) is disposed between the second money handling apparatus 2 and the POS apparatus, the middle ware may generate and transmit to the first money handling apparatus 11 amount deposited information.

In Embodiment 3 described above, a case where setting information indicating the dispensable amount is generated for each worker has been described. However, in the present disclosure, setting information may be generated, for example, for each shop, for each floor of a shop, for each selling space, or for each second money handling apparatus. With such a form, the administrator managing revenue and expenditure of a shop by using the money handling system can set the dispensable amount with high flexibility, and convenience is increased.

Figure 6:
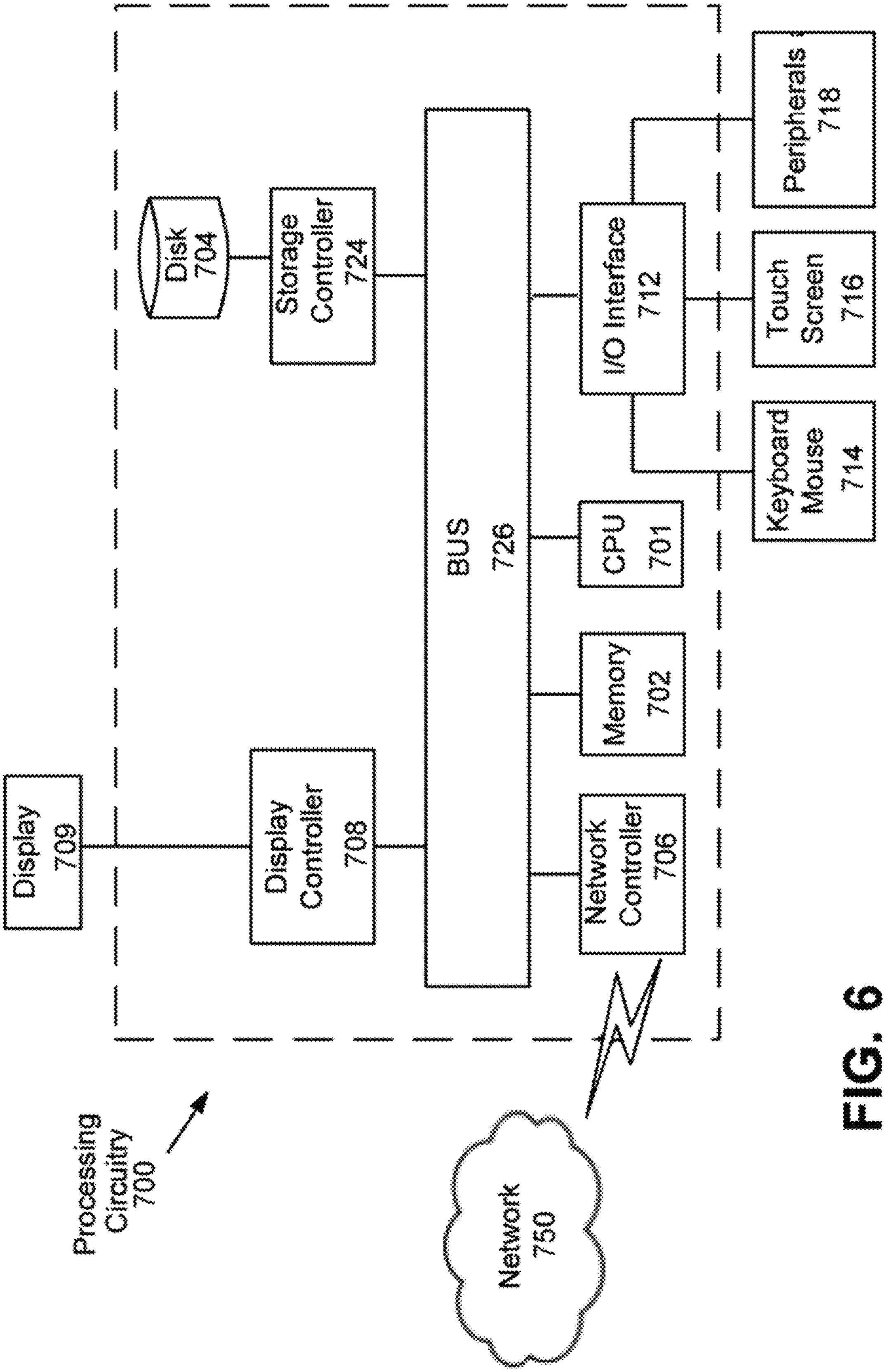
FIG. 6 is a block diagram of processing circuitry that performs computer-based operations in accordance with the present disclosure.

FIG. 6 is a block diagram of processing circuitry that performs computer-based operations in accordance with the present disclosure. FIG. 6 illustrates processing circuitry 700 which is included in or encompasses the setting unit 12, which is a component of the money handling system 1 in one or more aspects of the present disclosure. Additionally, processing circuitry 700 is included in or encompasses control unit 112, which is a component of the first money handling apparatus 11.

Processing circuitry 700 is used to control any computer-based and cloud-based control processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The functionality of the elements disclosed herein may be implemented using circuitry or processing circuitry which may include general purpose processors, special purpose processors, integrated circuits, ASICs ("Application Specific Integrated Circuits"), conventional circuitry and/or combinations thereof which are configured or programmed to perform the disclosed functionality. Processors are processing circuitry or circuitry as they include transistors and other circuitry therein. The processor may be a programmed processor which executes a program stored in a memory. In the disclosure, the processing circuitry, units, or means are hardware that carry out or are programmed to perform the recited functionality. The hardware may be any hardware disclosed herein or otherwise known which is programmed or configured to carry out the recited functionality.

In FIG. 6, the processing circuitry 700 includes a CPU 701 which performs one or more of the control processes discussed in this disclosure. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other non-transitory computer readable medium of an information processing device with which the processing circuitry 700 communicates, such as a server or computer. The processes may also be stored in network based storage, cloud-based storage or other mobile accessible storage and executable by processing circuitry 700.

Further, the claimed advancements may be provided as a utility application, background daemon, or component of an operating system, or combination thereof, executing in conjunction with CPU 701 and an operating system such as Microsoft Windows, UNIX, Solaris, LINUX, Apple MAC-OS, Apple iOS and other systems known to those skilled in the art.

The hardware elements in order to achieve the processing circuitry 700 may be realized by various circuitry elements. Further, each of the functions of the above described embodiments may be implemented by circuitry, which includes one or more processing circuits. A processing circuit includes a particularly programmed processor, for example, processor (CPU) 701, as shown in FIG. 6. A processing circuit also includes devices such as an application specific integrated circuit (ASIC) and conventional circuit components arranged to perform the recited functions.

In FIG. 6, the processing circuitry 700 may be a computer or a particular, special-purpose machine. Processing circuitry 700 is programmed to execute processing to control terminal device 10/server device 20.

Alternatively, or additionally, the CPU 701 may be implemented on an FPGA, ASIC, PLD or using discrete logic circuits, as one of ordinary skill in the art would recognize. Further, CPU 701 may be implemented as multiple processors cooperatively working in parallel to perform the instructions of the inventive processes described above.

The processing circuitry 700 in FIG. 6 also includes a network controller 706, such as an Ethernet PRO network interface card, for interfacing with network 750. As can be appreciated, the network 750 can be a public network, such as the Internet, or a private network such as a local area network (LAN) or wide area network (WAN), or any combination thereof and can also include Public Switched Telephone Network (PSTN) or Integrated Services Digital Network (ISDN) sub-networks. The network 750 can also be wired, such as an Ethernet network, universal serial bus (USB) cable, or can be wireless such as a cellular network including EDGE, 3G and 4G wireless cellular systems. The wireless network can also be Wi-Fi, wireless LAN, Bluetooth, or any other wireless form of communication that is known. Additionally, network controller 706 may be compliant with other direct communication standards, such as Bluetooth, a near field communication (NFC), infrared ray or other.

The processing circuitry 700 further includes a display controller 708, such as a graphics card or graphics adaptor for interfacing with display 709, such as a monitor. An I/O interface 712 interfaces with a keyboard and/or mouse 714 as well as a touch screen panel 716 on or separate from display 709. I/O interface 712 also connects to a variety of peripherals 718.

The storage controller 724 connects the storage medium disk 704 with communication bus 726, which may be an ISA, EISA, VESA, PCI, or similar, for interconnecting all of the components of the processing circuitry 700. A description of the general features and functionality of the display 709, keyboard and/or mouse 714, as well as the display controller 708, storage controller 724, network controller 706, and I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The invention claimed is:

1. A money handling system comprising:

a first money handler having an output sized to dispense money;

a second money handler different than the first money handler; and processing circuitry configured to set information indicating an amount dispensable from the first money handler, based on an upper limit amount set in advance as an upper limit of the amount dispensable from the first money handler, an amount of money dispensed from the first money handler, and an amount of money deposited into at least the second money handler different than the first money handler, accept an operation performed by a user for money to be dispensed to replenish the second money handler, determine whether dispensing of an amount of money requested in the operation is allowed based on the set information, in a case that the amount of money requested in the operation is allowed, cause the first money handler to dispense the amount of money requested by the user, and in response to money being deposited into the second money handler in a replenishment process, receive, from the second money handler, information indicating an amount of the deposited money.

2. The money handling system according to claim 1, wherein the processing circuitry is further configured to set information indicating a difference between the upper limit amount and the amount of money dispensed from the first money handler as the amount dispensable from the first money handler, after money is dispensed from the first money handler and before money is deposited into the first money handler or the second money handler.

3. The money handling system according to claim 1, wherein the upper limit amount is set in advance for each of users of the first money handler, and the processing circuitry is further configured to set the amount dispensable from the first money handler for each of the users.

4. The money handling system according to claim 1, wherein the second money handler comprises a user interface via which identification information of the user depositing money is input, and the processing circuitry is further configured to receive data in which the identification information of the user depositing money and the amount of the deposited money are associated with each other, and the processing circuitry is further configured to set the amount dispensable from the first money handler, based on the data.

5. A money handling method to be performed by a computer, the money handling method comprising:

obtaining amount dispensed information indicating an amount of money dispensed from a first money handler;

obtaining amount deposited information indicating an amount of money deposited into the first money handler or a second money handler;

setting an amount dispensable from the first money handler, based on an upper limit amount set in advance as an upper limit of the amount dispensable from the first money handler, the amount dispensed information, and the amount deposited information;

accepting an operation performed by a user for money to be dispensed to replenish the second money handler different than the first money handler;

determining whether dispensing of an amount of money requested in the operation is allowed based on the set information; and in a case that the amount of money requested in the operation is allowed, causing the first money handler to dispense the amount of money requested by the user.

6. The money handling method according to claim 5, wherein a difference between the upper limit amount and the amount of money dispensed from the first money handler is set as the amount dispensable from the first money handler, after money is dispensed from the first money handler and before money is deposited into the first money handler or the second money handler.

7. The money handling method according to claim 5, wherein the amount deposited information indicates the amount of money deposited into the second money handler.

8. The money handling method according to claim 5, wherein the upper limit amount is set in advance for each of users of the first money handler, and for each of the users, the computer obtains the amount dispensed information and the amount deposited information and temporarily sets a difference between the upper limit amount and the amount of money dispensed from the first money handler as the amount dispensable from the first money handler.

* * * * *